US012546314B2

(12) United States Patent
Teshima et al.

(10) Patent No.: US 12,546,314 B2
(45) Date of Patent: Feb. 10, 2026

(54) SCROLL COMPRESSOR

(71) Applicant: SANDEN CORPORATION, Gunma (JP)

(72) Inventors: Atsuo Teshima, Gunma (JP); Taizo Sato, Gunma (JP); Eiichi Oshio, Gunma (JP); Hitoshi Akuzawa, Gunma (JP); Kyoshiro Nishiyama, Gunma (JP); Takuya Tsukui, Gunma (JP)

(73) Assignee: SANDEN CORPORATION, Gunma (JP)

( * ) Notice: Subject to any disclaimer, the term of this patent is extended or adjusted under 35 U.S.C. 154(b) by 0 days.

(21) Appl. No.: 18/872,919

(22) PCT Filed: Jun. 26, 2023

(86) PCT No.: PCT/JP2023/023503
§ 371 (c)(1),
(2) Date: Dec. 9, 2024

(87) PCT Pub. No.: WO2024/018831
PCT Pub. Date: Jan. 25, 2024

(65) Prior Publication Data

US 2025/0354554 A1 Nov. 20, 2025

(30) Foreign Application Priority Data

Jul. 22, 2022 (JP) ................................ 2022-117358

(51) Int. Cl.
*F04C 18/02* (2006.01)

(52) U.S. Cl.
CPC ...... *F04C 18/0215* (2013.01); *F04C 18/0284* (2013.01); *F04C 2230/91* (2013.01); *F05C 2201/903* (2013.01)

(58) Field of Classification Search
CPC ........................ F04C 18/0215; F04C 18/0284; F04C 23/008; F04C 2230/90; F04C 2230/91; F04C 2230/92; F05C 2201/903
See application file for complete search history.

(56) References Cited

U.S. PATENT DOCUMENTS 5,318,424 A * 6/1994 Bush .................. F04C 18/0269 418/150
5,336,068 A * 8/1994 Sekiya ................ F04C 18/0215 418/55.2

(Continued)

FOREIGN PATENT DOCUMENTS

JP H02-009987 A 1/1990
JP H07-035057 A 2/1995

(Continued)

OTHER PUBLICATIONS

International Search Report dated Sep. 5, 2023 filed in PCT/JP2023/023503.

*Primary Examiner* — Dapinder Singh
(74) *Attorney, Agent, or Firm* — Rankin, Hill & Clark LLP

(57) ABSTRACT

A first coating layer formed by tin plating is formed on a compression chamber-side end face of a baseplate of one scroll and a surface of a spiral wall, a second coating layer formed by nickel-phosphorus plating is formed on a compression chamber-side end face of a baseplate of another scroll and a surface of a spiral wall, a wall height of the spiral wall of the other scroll is higher than a wall height of the spiral wall of the one scroll, and the first coating layer at the tip of the spiral wall of the one scroll and the second coating layer of the baseplate of the other scroll are separated from each other, and the first coating layer of the baseplate of the (Continued)

one scroll and the second coating layer at the tip of the spiral wall of the other scroll are in contact with each other.

2 Claims, 3 Drawing Sheets

(56) References Cited

U.S. PATENT DOCUMENTS

| | | | | | |
|---|---|---|---|---|---|
| 5,370,512 | A * | 12/1994 | Fujitani | F04C 18/0269 418/55.2 |
| 5,755,898 | A * | 5/1998 | Yamamoto | F04C 18/0246 148/439 |
| 2017/0306963 | A1* | 10/2017 | Lee | F04C 18/0269 |
| 2018/0038368 | A1* | 2/2018 | Sato | F04C 18/0276 |
| 2021/0148361 | A1* | 5/2021 | Sato | F04C 18/0276 |

FOREIGN PATENT DOCUMENTS

| | | | |
|---|---|---|---|
| JP | 2941680 | B2 | 8/1999 |
| JP | 2001-304151 | A | 10/2001 |
| JP | 2016-169661 | A | 9/2016 |
| WO | 2023/112630 | A1 | 6/2023 |

* cited by examiner

COMPARATIVE EXAMPLE

ANOTHER COMPARATIVE EXAMPLE

SCROLL COMPRESSOR

TECHNICAL FIELD

The present invention relates to a scroll compressor used in a vehicle air conditioner and the like.

BACKGROUND ART

A scroll compressor disclosed in Patent Literature 1 includes a fixed scroll and an orbiting scroll that are disposed to mesh with each other and have a baseplate and a spiral wall erected on the baseplate. The orbiting scroll revolves with respect to the fixed scroll to compress a fluid taken into a compression chamber formed between the fixed scroll and the orbiting scroll. In the scroll compressor disclosed in Patent Literature 1, the fixed scroll and the orbiting scroll are made of an aluminum-based material for weight reduction, and a coating layer formed by nickel-phosphorus plating is formed on a baseplate of the orbiting scroll and a surface of the spiral wall.

CITATION LIST

Patent Literature

Patent Document 1: Japanese Patent No. 2941680

SUMMARY OF INVENTION

Problems to be Solved by Invention

However, in the scroll compressor disclosed in Patent Literature 1, since the fixed scroll is not plated and the aluminum-based material is exposed on the surface of the fixed scroll, the coating layer formed by nickel-phosphorus plating at the tip of the spiral wall of the orbiting scroll might slide directly on the aluminum-based material of the baseplate of the fixed scroll. Since the mutual solubility between the nickel component and the aluminum component is relatively high, in the scroll compressor disclosed in Patent Literature 1, for example, the tip of the spiral wall of the orbiting scroll might adhere to the baseplate containing the aluminum component of the fixed scroll via the coating layer containing the nickel component, and there is room for improvement in terms of durability.

The present invention has been made to solve the above problems, and an object of the present invention is to provide a scroll compressor having a structure capable of improving durability while reducing weight of the scrolls.

Solution to Problems

According to an aspect of the present invention, there is provided a scroll compressor including a fixed scroll and an orbiting scroll that are disposed to mesh with each other and have a baseplate and a spiral wall erected on the baseplate, in which the fixed scroll is configured to revolve the orbiting scroll with respect to the fixed scroll to compress a fluid taken into a compression chamber formed between the fixed scroll and the orbiting scroll. In the scroll compressor, the fixed scroll and the orbiting scroll are made of an aluminum-based material, a first coating layer formed by tin plating is formed on a compression chamber-side end face of the baseplate of one scroll of the fixed scroll and the orbiting scroll and a surface of the spiral wall of the one scroll, and a second coating layer formed by nickel-phosphorus plating is formed on a compression chamber-side end face of the baseplate of another scroll of the fixed scroll and the orbiting scroll and a surface of the spiral wall of the other scroll. A wall height of the spiral wall of the other scroll is set higher than a wall height of the spiral wall of the one scroll, the first coating layer at a tip of the spiral wall of the one scroll and the second coating layer of the baseplate of the other scroll are separated from each other, and the first coating layer of the baseplate of the one scroll and the second coating layer at a tip of the spiral wall of the other scroll are in contact with each other.

Effects of Invention

According to the present invention, it is possible to provide a scroll compressor having a structure capable of improving durability while reducing weight of each scroll.

DESCRIPTION OF EMBODIMENTS

In the following, an embodiment of the present invention will be described with reference to the accompanying drawings.

Figure 1:
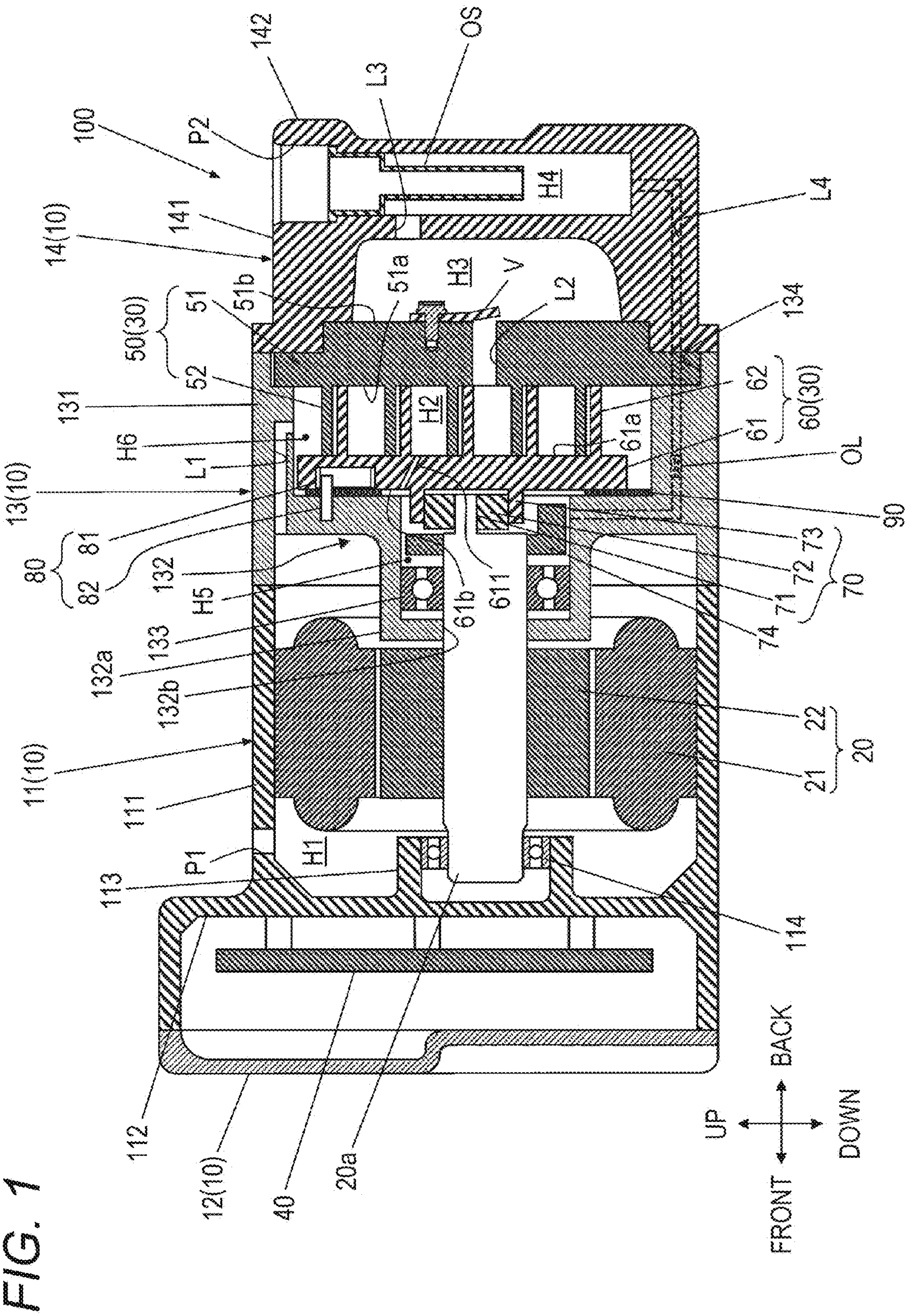
FIG. 1 is a cross-sectional view of a scroll compressor according to an embodiment of the present invention.

FIG. 1 is a cross-sectional view showing a schematic configuration of a scroll compressor 1 according to an embodiment of the present invention. The scroll compressor 1 is incorporated in a refrigerant circuit of a vehicle air conditioner and the like, and is configured to receive a low-pressure gas refrigerant from the refrigerant circuit, compress the gas refrigerant, increase the pressure of the gas refrigerant, and return the gas refrigerant to the refrigerant circuit. Note that FIG. 1 shows an example of a front-rear direction and an example of a vertical direction in a use state of the scroll compressor 1. In addition, the gas refrigerant described above is an example of a fluid in the present invention.

The scroll compressor 1 includes a housing 10, a rotating shaft 20*a*, an electric motor 20 that rotates the rotating shaft 20*a*, a scroll unit 30 that is driven by the rotating shaft 20*a* and compresses a (low-pressure) gas refrigerant, and an inverter 40 that drives and controls the electric motor 20. In the housing 10, main components (10, 20*a*, 30, 40) are housed. The scroll unit 30 includes a fixed scroll 50 and an orbiting scroll 60. The fixed scroll 50 and the orbiting scroll 60 face each other in the central axis direction of the scroll compressor 1 and are disposed to mesh with each other.

The housing 10 includes a front housing 11, a cover member 12, a center housing 13, and a rear housing 14. These components (11, 12, 13, 14) are fastened with a fastener (not shown) or the like to constitute the housing 10 of the scroll compressor 1.

The front housing 11 includes a first peripheral wall portion 111 having a cylindrical shape and a first partition wall portion 112 that partitions the inside of the first peripheral wall portion 111 in the front-rear direction. The internal space of the first peripheral wall portion 111 is partitioned into an inverter housing space on the front side and a motor housing space on the ear side with the first partition wall portion 112. The first partition wall portion 112 is provided with a support portion 113 that supports the front end portion of the rotating shaft 20*a*, and the support portion 113 rotatably supports the front end portion of the rotating shaft 20*a* via a first bearing 114.

The cover member 12 is joined to a front end surface of the front housing 11. As a result, the inverter housing space is closed. To a rear end surface of the front housing 11, a front end surface of the center housing 13 is joined.

The center housing 13 includes a second peripheral wall portion 131 having a cylindrical shape and a second partition wall portion 132 that partitions the inside of the second peripheral wall portion 131 in the front-rear direction. The internal space of the second peripheral wall portion 131 is partitioned with the second partition wall portion 132 into a front connection space connected to the motor housing space and a rear scroll housing space. The second partition wall 132 has a hollow protruding portion 132*a* protruding toward the front housing 11. The hollow protruding portion 132*a* is formed with a rotating shaft insertion hole 132*b*. The hollow protruding portion 132*a* rotatably supports a rear end side portion of the rotating shaft 20*a* via the second bearing 133.

The rear housing 14 is joined to a rear end surface of the center housing 13. For example, a recessed portion 134 is formed on a rear end surface of the center housing 13 (second peripheral wall portion 131). The outer edge portion of the fixed scroll 50 is sandwiched between the center housing 13 and the rear housing 14, and thus the rear opening of the second peripheral wall portion 131 is closed by the fixed scroll 50. The rear housing 14 includes a third peripheral wall portion 141 having a cylindrical shape and a bottom wall portion 142 that closes a rear opening of the third peripheral wall portion 141. The front end surface of the third peripheral wall portion 141 is joined to the rear end surface of the second peripheral wall portion 131, and thus the front opening of the third peripheral wall portion 141 is closed by the fixed scroll 50.

The electric motor 20 is constituted of, for example, a three-phase AC motor, and includes a stator core unit 21 and a rotor 22. The stator core unit 21 is fixed to the inner peripheral surface of the first peripheral wall portion 111 of the front housing 11. To the stator core unit 21, a direct current from an in-vehicle battery (not shown) or the like is converted into an alternating current by the inverter 40 and supplied. The rotor 22 is disposed with a predetermined gap on the radially inner side of the stator core unit 21. The rotor 22 is formed in a cylindrical shape, and is fixed to the rotating shaft 20*a* in a state where the rotating shaft 20*a* is inserted into its hollow portion. The rotor 22 is integrated with the rotating shaft 20*a*.

In the electric motor 20, when a magnetic field is generated in the stator core unit 21 by power supply from the inverter 40, a rotational force acts on the permanent magnet incorporated in the rotor 22 to rotate the rotor 22, and this rotates the rotating shaft 20*a*.

As described above, the scroll unit 30 includes the fixed scroll 50 and the orbiting scroll 60 that revolves with respect to the fixed scroll 50. The fixed scroll 50 and the orbiting scroll 60 are disposed to mesh with each other, and the fixed scroll 50 and the orbiting scroll 60 respectively have a baseplate (51, 61) and a spiral wall (52, 62) erected on the baseplate (51, 61). Both the fixed scroll 50 and the orbiting scroll 60 are made of an aluminum-based material. Specifically, aluminum alloy is used as a material for each scroll (50, 60) to reduce the weight of the scroll unit 30.

Specifically, the fixed scroll 50 includes a baseplate 51 in a disk shape (in the following, the baseplate is appropriately referred to as a fixed baseplate 51) and a spiral wall 52 (in the following, appropriately referred to as a fixed spiral wall 52) having a spiral shape and erected on a compression chamber-side end face 51*a* of the fixed baseplate 51. The orbiting scroll 60 includes a baseplate 61 in a disk shape (in the following, the baseplate is appropriately referred to as an orbiting baseplate 61) and a spiral wall 62 (in the following, the spiral wall is appropriately referred to as an orbiting spiral wall 62) erected on a compression chamber-side end face 61*a* of the orbiting baseplate 61. The orbiting scroll 60 is disposed such that the orbiting spiral wall 62 meshes with the fixed spiral wall 52 of the fixed scroll 50. The orbiting scroll 60 is driven by the rotating shaft 20*a* via a crank mechanism 70, and revolves with respect to the fixed scroll 50.

The crank mechanism 70 is configured to connect the rotating shaft 20*a* and the orbiting scroll 60, and to convert the rotational motion of the rotating shaft 20*a* into the orbital revolution motion of the orbiting scroll 60. The crank mechanism 70 includes a crank pin 71 erected at the rear end of the rotating shaft 20*a*, an eccentric bush 72 eccentrically attached to the crank pin 71, and a cylindrical portion 73 formed to protrude from the back surface of the orbiting baseplate 61 of the orbiting scroll 60. The eccentric bush 72 is rotatably supported on the inner peripheral surface of the cylindrical portion 73 via a bearing (not shown). Note that a balancer weight 74 is attached to the rear end of the rotating shaft 20*a*.

The rotation of the orbiting scroll 60 can be blocked by an anti-rotation mechanism 80. The anti-rotation mechanism 80 is configured such that a plurality of rotation preventing portions each including the ring 81 and the pin 82 is arranged at equal intervals along the circumferential direction near the outer peripheral edge of the back surface of the orbiting baseplate 61. The ring 81 is press-fitted into a circular hole formed in a back surface 61*b* that is a surface opposite to the compression chamber-side end face 61*a* of the orbiting baseplate 61, and the pin 82 is provided in a protruding manner in the second partition wall portion 132 of the center housing 13, penetrates the thrust plate 90, and is loosely fitted into the ring 81.

The scroll unit 30 is configured to take in and compress a low-pressure gas refrigerant when the orbiting scroll 60 revolves with respect to the fixed scroll 50. Between the orbiting baseplate 61 of the orbiting scroll 60 and the second partition wall 132 of the center housing 13, an annular plate-shaped thrust plate 90 is disposed, and a rear surface of the second partition wall 132 receives a thrust force from the orbiting scroll 60 via the thrust plate 90.

Here, the scroll compressor 1 includes a suction chamber H1 into which a low-pressure gas refrigerant flows, a compression chamber H2 that compresses the low-pressure gas refrigerant, a discharge chamber H3 from which the gas refrigerant compressed in the compression chamber H2 is discharged, a gas-liquid separation chamber H4 that separates lubricating oil from the gas refrigerant compressed in the compression chamber H2, and a back pressure chamber H5 provided on the back side of the orbiting scroll 60 (the back side of the orbiting baseplate 61).

The suction chamber H1 is defined by the front housing 11 (the first peripheral wall portion 111, the first partition wall portion 112) and the center housing 13 (the second peripheral wall portion 131, the second partition wall portion 132). The first peripheral wall portion 111 is formed with a suction port P1 that is connected to (the low-pressure side of) the refrigerant circuit via a connection pipe (not shown) or the like. Therefore, the low-pressure refrigerant from the refrigerant circuit flows into the suction chamber H1 through the suction port P1. In addition, the center housing 13 is formed with a refrigerant passage L1 that guides the low-pressure gas refrigerant in the suction chamber H1 to the space H6 near the outer end of the scroll unit 30.

The compression chamber H2 is formed between the fixed scroll 50 and the orbiting scroll 60. The scroll unit 30 is configured to compress the low-pressure gas refrigerant by taking the low-pressure gas refrigerant from the space H6 when the compression chamber H2 is formed. The scroll compressor 1 is configured to revolve the orbiting scroll 60 with respect to the fixed scroll 50 to compress the gaseous refrigerant (fluid) taken into the compression chamber H2 formed between the fixed scroll 50 and the orbiting scroll 60.

The discharge chamber H3 is formed of the rear housing 14 (the third peripheral wall portion 141, the bottom wall portion 142) and the fixed scroll 50 (the fixed baseplate 51). The gas refrigerant compressed in the compression chamber H2 is discharged to the discharge chamber H3 through the discharge hole L2 formed at the radial center of the fixed baseplate 51. On the surface 51*b* of the fixed baseplate 51 on the side opposite to the compression chamber-side end face 51*a* of the fixed scroll 50, a check valve V is attached. The check valve Vis a reed valve, for example, that allows the flow of the gas refrigerant from the compression chamber H2 to the discharge chamber H3 but regulates the flow of the gas refrigerant from the discharge chamber H3 to the compression chamber H2.

The gas-liquid separation chamber H4 is provided in the rear housing 14. For example, a centrifugal oil separator OS is disposed in the gas-liquid separation chamber H4. The discharge port P2 provided above the oil separator OS is connected to (the high-pressure side of) the refrigerant circuit via a connection pipe (not shown) or the like. The gas refrigerant (high-pressure gas refrigerant) in the discharge chamber H3 flows into the gas-liquid separation chamber H4 through the communication hole L3 formed in the bottom wall portion 142 of the rear housing 14, the lubricating oil contained in the gas refrigerant is separated by the oil separator OS, and then the gas refrigerant is led out from the discharge port P2 to the high-pressure side of the refrigerant circuit. On the other hand, the lubricating oil separated from the high-pressure gas refrigerant by the oil separator OS is guided to the lower portion of the gas-liquid separation chamber H4 by gravity.

The back pressure chamber H5 is formed between the orbiting baseplate 61 and the second partition wall 132. In the present embodiment, the back pressure chamber H5 includes the internal space of the hollow protruding portion 132*a* of the second partition wall portion 132. In the center housing 13, the fixed baseplate 51, and the rear housing 14, a lubricating oil passage L4 connecting the back pressure chamber H5 and the gas-liquid separation chamber H4 is formed. The lubricating oil passage L4 is disposed with an orifice (throttle portion) OL. In the gas-liquid separation chamber H4, the lubricating oil separated by the oil separator OS is supplied to the back pressure chamber H5 via the lubricating oil passage L4 in a state of being decompressed by the orifice OL. The back pressure chamber H5 can communicate with the compression chamber H2 via a through hole 611 that can function as a throttle portion formed in the orbiting baseplate 61. Therefore, the flow rate of the fluid (lubricating oil and/or gas refrigerant) moving between the back pressure chamber H5 and the compression chamber H2 is limited by the through hole 611. As a result, the pressure in the back pressure chamber H5 is held at an intermediate pressure (back pressure) between the pressure in the suction chamber H1 and the pressure in the discharge chamber H3, and the orbiting scroll 60 is pressed against the fixed scroll 50 by the intermediate pressure (back pressure). That is, the back pressure chamber H5 causes a back pressure (back pressure load) that presses the orbiting scroll 60 against the fixed scroll 50 to act on the orbiting scroll 60.

Here, in order to improve durability of the scroll unit 30, it is considered that tin plating (in the following, it is appropriately referred to as Sn plating) or nickel-phosphorus plating (in the following, it is appropriately referred to as Ni—P plating) is applied to the scroll unit 30. Sn plating is plating that is excellent in lubricity, has good compatibility with other materials, and easily improves the critical surface pressure (specifically, a surface pressure at which seizure occurs when a material slides with the other material at a predetermined sliding speed). In addition, the construction cost of Sn plating is generally lower than the construction cost of Ni—P plating. However, as compared with the Ni—P plating, the Sn plating is easily worn and easily peeled off from the plated surface. Furthermore, Sn plating is inferior in heat resistance to Ni—P plating. Therefore, when the same portion of the Sn plating slides continuously for a long time, the Sn plating disappears from the plated surface due to abrasion or peeling, and the plated surface might be exposed. The Ni—P plating is more excellent in heat resistance than the Sn plating. However, the mutual solubility of nickel and aluminum is relatively high. The inventors of the present application have paid attention to the high mutual solubility of nickel and aluminum, and have found that it is not a preferable sliding state that the Ni—P plating directly contacts the aluminum-based material of the scroll unit 30.

The scroll compressor 1 according to the present embodiment has a structure described below as a structure that improves durability of the scroll unit 30 while reducing the weight of the scroll unit 30.

Figure 2:
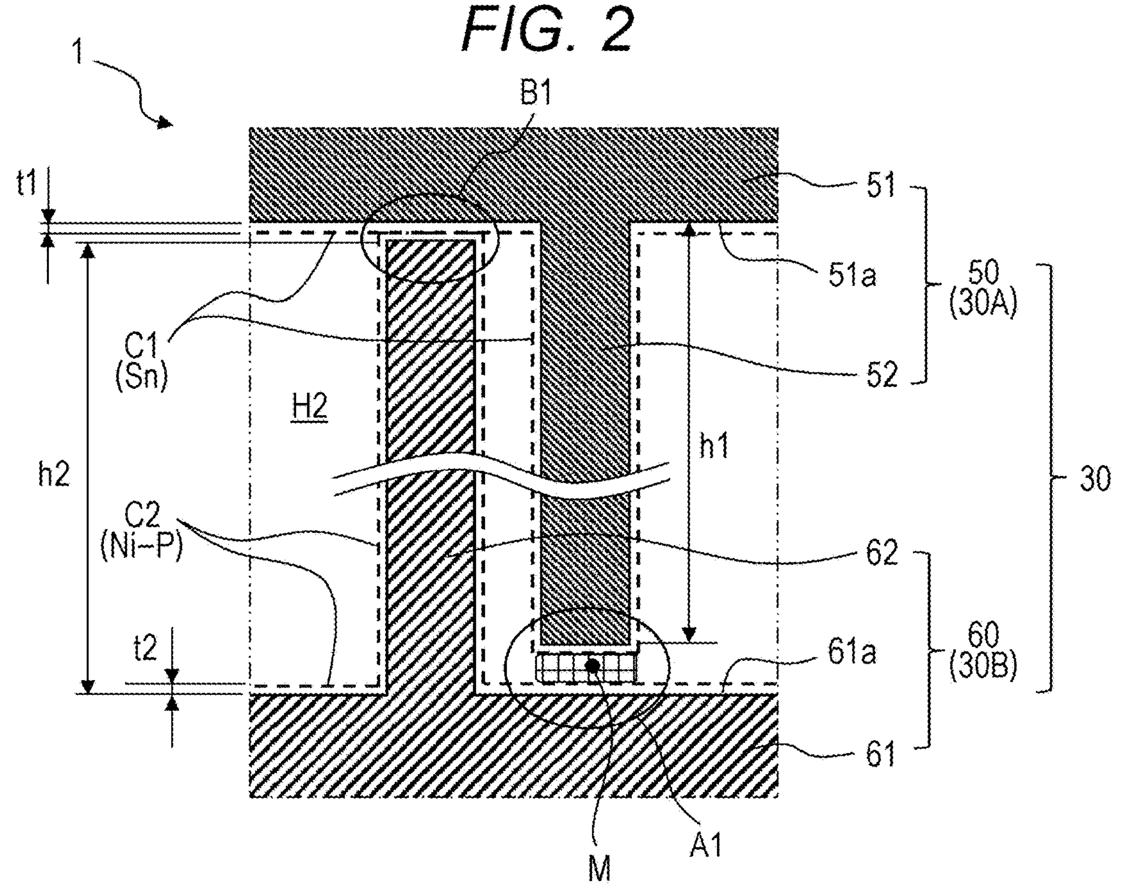
FIG. 2 is an enlarged cross-sectional view of a main part for explaining a main part of the scroll compressor.

FIG. 2 is an enlarged cross-sectional view of a main part for explaining a main part of the scroll compressor 1.

In the scroll unit 30 of the scroll compressor 1 according to the present embodiment, the compression chamber-side end face (51*a* or 61*a*) of the baseplate (51 or 61) of one of the fixed scroll 50 and the orbiting scroll 60 of the scroll 30A and the surface of the spiral wall (52 or 62) of the one scroll 30A are provided with the first coating layer C1 formed by tin plating. The first coating layer C1 (in other words, the Sn plated layer) has a first layer thickness t1, which is a predetermined plating thickness, and a plating application site in the one scroll 30A is covered with the first coating layer C1 (Sn plating layer) having the first layer thickness t1 made of, for example, electroless Sn.

On a compression chamber-side end face (61*a* or 51*a*) of a baseplate (61 or 51) of another scroll 30B of the fixed scroll 50 and the orbiting scroll 60 and a surface of a spiral wall (62 or 52) of the other scroll 30B, a second coating layer C2 formed by nickel-phosphorus plating is formed. The second coating layer C2 (in other words, the Ni—P plating layer) has a second layer thickness t2, which is a predetermined plating thickness, and a plating application site in the other scroll 30B is covered with the second coating layer C2 (Ni—P plating layer) having the second layer thickness t2.

That is, in the scroll unit 30, plating is applied to the compression chamber-side end face 51*a* of the fixed baseplate 51 and the fixed spiral wall 52 in the fixed scroll 50, and the compression chamber-side end face 61*a* of the orbiting baseplate 61 and the orbiting spiral wall 62 in the orbiting scroll 60.

In the present embodiment, the plating area of the orbiting scroll 60 is smaller than the plating area of the fixed scroll 50. Specifically, the orbiting baseplate 61 of the orbiting scroll 60 has an outer shape smaller than an outer shape of the fixed baseplate 51 of the fixed scroll 50. The plating area of the orbiting scroll 60 obtained by adding the surface area of the compression chamber-side end face 61*a* of the orbiting baseplate 61 and the surface area of the orbiting spiral wall 62 is smaller than the plating area of the fixed scroll 50 obtained by adding the surface area of the compression chamber-side end face 51*a* of the fixed baseplate 51 and the surface area of the fixed spiral wall 52.

In the present embodiment, the one scroll 30A that is a formation target of the first coating layer C1 by tin plating is the fixed scroll 50, and the other scroll 30B that is a formation target of the second coating layer C2 by nickel-phosphorus plating is the orbiting scroll 60. That is, the one scroll 30A on which the first coating layer C1 formed by tin plating is formed is the fixed scroll 50, and the other scroll 30B on which the second coating layer C2 formed by nickel-phosphorus plating is formed is the orbiting scroll 60.

Therefore, in the present embodiment, the first coating layer C1 formed by tin plating is formed on the compression chamber-side end face 51*a* of the fixed baseplate 51 and the surface of the fixed spiral wall 52 in the fixed scroll 50 as the one scroll 30A. In other words, in the present embodiment, the first coating layer C1 (Sn plating layer) is formed on the fixed scroll 50 having a relatively large (wide) plating area out of the fixed scroll 50 and the orbiting scroll 60.

In the present embodiment, the second coating layer C2 formed by nickel-phosphorus plating is formed on the compression chamber-side end face 61*a* of the orbiting baseplate 61 and the surface of the orbiting spiral wall 62 in the orbiting scroll 60 as the other scroll 30B. In other words, in the present embodiment, the second coating layer C2 (Ni—P plating layer) is formed on the orbiting scroll 60 having a relatively small (narrow) plating area out of the fixed scroll 50 and the orbiting scroll 60.

Referring to FIG. 2, a wall height h2, which is a wall height of the spiral wall (in the present embodiment, the orbiting spiral wall 62) of the other scroll 30B, is set higher than a wall height h1 of the spiral wall (in the present embodiment, the fixed spiral wall 52) of the one scroll 30A. Specifically, the wall height h2 of the orbiting spiral wall 62 is a distance from the compression chamber-side end face 61*a* of the orbiting baseplate 61 to the distal end surface of the orbiting spiral wall 62, and the wall height h1 of the fixed spiral wall 52 is a distance from the compression chamber-side end face 51*a* of the fixed baseplate 51 to the distal end surface of the fixed spiral wall 52.

The first coating layer C1 (Sn plating layer) at the tip of the spiral wall (fixed spiral wall 52) of one scroll 30A and the second coating layer C2 (Ni—P plating layer) of the baseplate (orbiting baseplate 61) of the other scroll 30B are separated from each other, and the first coating layer C1 (Sn plating layer) of the baseplate (fixed baseplate 51) of one scroll 30A and the second coating layer C2 (Ni—P plating layer) at the tip of the spiral wall (orbiting spiral wall 62) of the other scroll 30B are in contact with each other. Therefore, during the scroll operation, the first coating layer C1 (Sn plating layer) at the tip of the spiral wall of one scroll 30A is always separated from the second coating layer C2 (Ni—P plating layer) of the baseplate of the other scroll 30B facing the first coating layer C1. On the other hand, the second coating layer C2 (Ni—P plating layer) at the tip of the spiral wall of the other scroll 30B slides on the first coating layer C1 (Sn plating layer) of the baseplate of the one scroll 30A.

Figure 3:
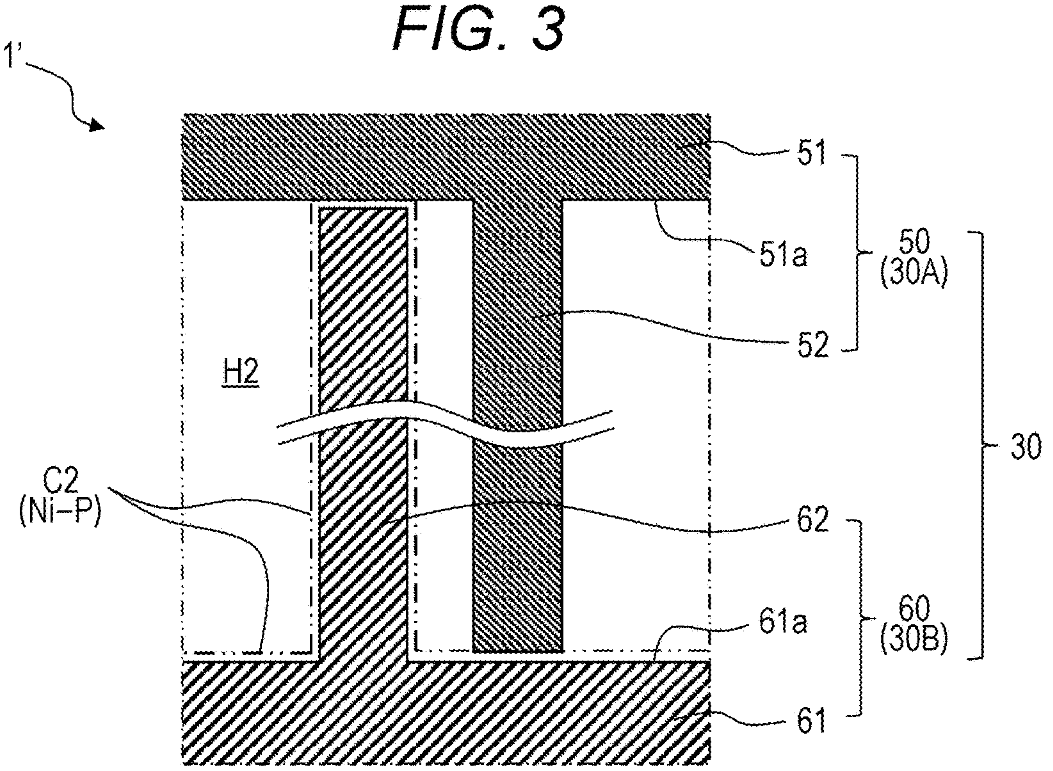
FIG. 3 is an enlarged cross-sectional view of a compressor according to a comparative example.
Figure 4:
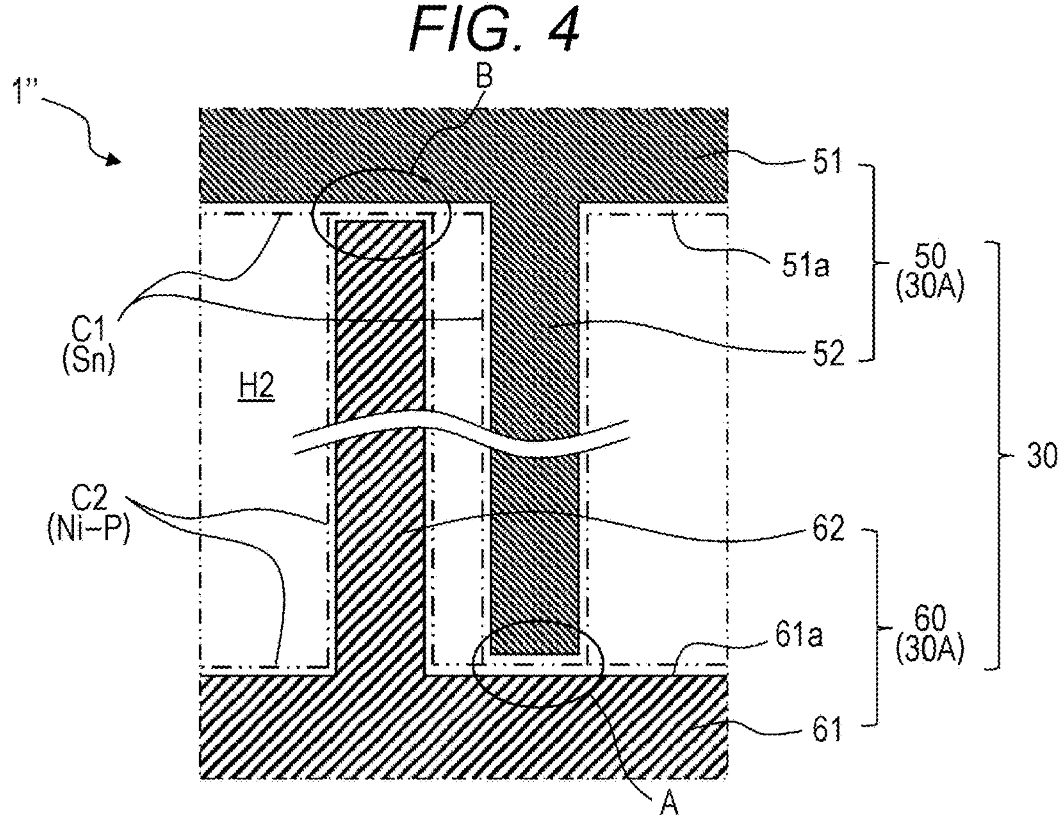
FIG. 4 is an enlarged cross-sectional view of a compressor according to another comparative example.

Next, effects of the scroll compressor 1 according to the present embodiment will be described in comparison with a scroll comparative compressor according to a comparative example. FIGS. 3 and 4 are enlarged cross-sectional views of a scroll-type comparative compressor (1', 1") for comparison with the scroll compressor 1 of the present embodiment shown in FIG. 2. FIG. 3 is an enlarged cross-sectional view of a scroll unit 30 of a comparative compressor 1' according to a comparative example, and FIG. 4 is an enlarged cross-sectional view of a scroll unit 30 of a comparative compressor 1" according to another comparative example.

Referring to FIG. 3, in the comparative compressor 1' according to the comparative example, a second coating layer C2 made of nickel-phosphorus is formed on a compression chamber-side end face 61*a* of an orbiting baseplate 61 of an orbiting scroll 60 and the surface of an orbiting spiral wall 62, but a fixed scroll 50 is not plated. Furthermore, the tip of a fixed spiral wall 52 of the fixed scroll 50 where the aluminum-based material (material) is exposed is in contact with the second coating layer C2 (Ni—P plating layer) formed on the compression chamber-side end face 61*a* of the orbiting baseplate 61. Therefore, in the comparative compressor 1' of the comparative example, during the scroll operation, the tip of an orbiting spiral wall 62 slides in direct contact with a compression chamber-side end face 51*a* of a fixed baseplate 51 containing the exposed aluminum component of the fixed scroll 50 via the second coating layer C2 containing the nickel component. Since the mutual solubility between the nickel component and the aluminum component is high, in the comparative compressor 1', large frictional heat is generated at the sliding portion between the tip of the orbiting spiral wall 62 of the orbiting scroll 60 (the surface of the second coating layer C2) and the compression chamber-side end face 51*a* of the fixed baseplate 51 of the fixed scroll 50, and the temperature of the sliding portion might be excessively increased. In this case, in the comparative compressor 1', the tip of the orbiting spiral wall 62 of the orbiting scroll 60 might adhere to the compression chamber-side end face 51*a* of the exposed fixed baseplate 51 containing the aluminum component of the fixed scroll 50 via the second coating layer C2 containing the nickel component. Similarly, in the comparative compressor 1', the tip of the exposed fixed spiral wall 52 containing the aluminum component of the fixed scroll 50 might adhere to the compression chamber-side end face 61*a* of the orbiting baseplate 61 of the orbiting scroll 60 via the second coating layer C2 containing the nickel component. That is, in the comparative compressor 1', since the second coating layer C2 (Ni—P plating layer) containing the nickel component applied to the orbiting scroll 60 slides in direct contact with the exposed aluminum-based material (aluminum material) of the fixed scroll 50, adhesion of both scrolls (50, 60) might occur.

On the other hand, in the scroll compressor 1 according to the present embodiment, the first coating layer C1 formed by tin plating is formed on the compression chamber-side end face of the baseplate of one scroll 30A and the surface of the spiral wall, and the second coating layer C2 formed by nickel-phosphorus plating is formed on the compression chamber-side end face of the baseplate of the other scroll 30B and the surface of the spiral wall. Therefore, in the scroll compressor 1, the second coating layer C2 (Ni—P plating layer) containing a nickel component applied to the other scroll 30B is stopped from sliding in a state of being in contact with the aluminum-based material (aluminum material) of the one scroll 30A.

Referring to FIG. 4, in the comparative compressor 1" according to another comparative example, a second coating layer C2 made of nickel-phosphorus is formed on a compression chamber-side end face 61*a* of an orbiting baseplate 61 of an orbiting scroll 60 and the surface of an orbiting spiral wall 62, and a first coating layer C1 made of tin plating is formed on a compression chamber-side end face 51*a* of a fixed baseplate 51 of a fixed scroll 50 and the surface of a fixed spiral wall 52. In the comparative compressor 1", a first coating layer C1 (Sn plating layer) on the compression chamber-side end face 51*a* of the fixed baseplate 51 of the fixed scroll 50 and the second coating layer C2 (Ni—P plating layer) at the tip of the orbiting spiral wall 62 of the orbiting scroll 60 are in contact with each other. Regarding these points, the structure of the comparative compressor 1" and the structure of the scroll compressor 1 according to the present embodiment are common. However, in the comparative compressor 1", the first coating layer C1 (Sn plating layer) at the tip of the fixed spiral wall 52 of the fixed scroll 50 and the second coating layer C2 (Ni—P plating layer) on the compression chamber-side end face 61*a* of the orbiting baseplate 61 of the orbiting scroll 60 are in contact with each other.

In comparative compressor 1 ", the wall height of the fixed spiral wall 52 of the fixed scroll 50 is equal to the wall height of the orbiting spiral wall 62 of the orbiting scroll 60. During the scrolling operation of the comparative compressor 1", a temperature rise due to frictional heat occurs in each of a contact pair A and a contact pair B below. The contact pair A is a sliding portion between the first coating layer C1 (Sn plating layer) at the tip of the fixed spiral wall 52 of the fixed scroll 50 and the second coating layer C2 (Ni—P plating layer) on the compression chamber-side end face 61*a* of the orbiting baseplate 61 of the orbiting scroll 60, and the contact pair B is a sliding portion between the first coating layer C1 (Sn plating layer) on the compression chamber-side end face 51*a* of the fixed baseplate 51 of the fixed scroll 50 and the second coating layer C2 (Ni—P plating layer) at the tip of the orbiting spiral wall 62 of the orbiting scroll 60.

As described above, the Sn plating is a plating that is easily worn and easily peeled off from the plated surface as compared with the Ni—P plating. Therefore, the inventors of the present application have investigated in detail the sliding state of the first coating layer C1 (Sn plating layer) in the contact pair A and the contact pair B of the comparative compressor 1".

In the comparative compressor 1", in the contact pair B, during the scroll operation, the first coating layer C1 (Sn plating layer) on the compression chamber-side end face 51*a* of the fixed baseplate 51 of the fixed scroll 50 intermittently (intermittently) slides on the second coating layer C2 due to revolution of the orbiting scroll 60. Therefore, in the intermittent (intermittent) sliding, the possibility of abrasion and peeling of the first coating layer C1 (Sn plating layer) on the compression chamber-side end face 51*a* of the fixed baseplate 51 in the contact pair B is low, and the first coating layer C1 (Sn plating layer) is likely to remain.

However, in the comparative compressor 1", in the contact pair A, the first coating layer C1 (Sn plating layer) at the tip of the fixed spiral wall 52 of the fixed scroll 50 continuously (always) slides on the second coating layer C2 during the scroll operation. Therefore, in the contact pair A, the first coating layer C1 (Sn plating layer) at the tip of the fixed spiral wall 52 of the fixed scroll 50 disappears from the tip of the fixed spiral wall 52 due to wear and peeling, and the aluminum-based material (aluminum material) might be exposed on the tip surface of the fixed spiral wall 52. As a result, when the fixed spiral wall 52 extends due to thermal expansion, a large frictional force is generated between the aluminum-based material exposed on the distal end surface of the fixed spiral wall 52 and the surface of the second coating layer C2 (Ni—P plating layer) of the compression chamber-side end face 61*a* of the orbiting baseplate 61, and these temperatures might excessively rise. In this case, in the comparative compressor 1", in the contact pair A, the tip of the exposed fixed spiral wall 52 containing the aluminum component of the fixed scroll 50 might adhere to the compression chamber-side end face 61*a* of the orbiting baseplate 61 of the orbiting scroll 60 via the second coating layer C2 containing the nickel component.

On the other hand, in the scroll compressor 1 according to the present embodiment, the first coating layer C1 (Sn plating layer) at the tip of the spiral wall of one scroll 30A, which is the pair A1 corresponding to the contact pair A, and the second coating layer C2 of the baseplate of the other scroll 30B are separated from each other. Therefore, in the scroll compressor 1, wear and peeling of the first coating layer C1 (Sn plating layer) at the tip of the spiral wall of one scroll 30A are stopped. As a result, in the scroll compressor 1, the tip of the spiral wall of one scroll 30A is reliably stopped from adhering to the second coating layer C2 on the compression chamber-side end face of the baseplate of the other scroll 30B, and durability is improved.

In the scroll compressor 1, a gap is formed between the first coating layer C1 (Sn plating layer) at the tip of the spiral wall of one scroll 30A and the second coating layer C2 of the baseplate of the other scroll 30B, and the first coating layer C1 (Sn plating layer) at the compression chamber-side end face of the baseplate of one scroll 30A and the second coating layer C2 at the tip of the spiral wall of the other scroll 30B are preferentially brought into contact with each other. As a result, in the scroll compressor 1, the pressing force in the pair A1 (the first coating layer C1 (Sn plating layer) at the tip of the spiral wall of one scroll 30A and second coating layer C2 on the baseplate of the other scroll 30B) corresponding to the contact pair A is smaller than the pressing force in the compressor 1" of the comparative example, and the pressing force in the pair B1 (the first coating layer C1 (Sn plating layer) on the compression chamber-side end face of the baseplate of one scroll 30A and second coating layer C2 at the tip of the spiral wall of the other scroll 30B) corresponding to the contact pair B is larger than the pressing force in the compressor 1" of the comparative example. In the pair B1 corresponding to the contact pair B in the scroll compressor 1, the pressing force increases, but the first coating layer C1 (Sn plating layer) on the compression chamber-side end face of the baseplate of one scroll 30A of the pair B1 intermittently slides with respect to the second coating layer C2. Therefore, the first coating layer C1 (Sn plating layer) in the pair B1 easily remains and has a high limit surface pressure.

In addition, in the present embodiment, in the scroll compressor 1, the gas refrigerant is taken into the compression chamber H2 together with the lubricating oil, and the oil film M made of the lubricating oil is formed in the gap between the first coating layer C1 at the tip of the spiral wall of one scroll 30A and the second coating layer C2 of the baseplate of the other scroll 30B. As a result, abrasion resistance and adhesion (galling) resistance are improved while airtightness of the compression chamber H2 is easily secured. As a result, the life of the Sn plating (the first coating layer C1) is increased, and the durability is more effectively improved.

As described above, in the scroll compressor 1 according to the present embodiment, the weight of the scroll unit 30 is reduced by employing the aluminum-based material as the material of the fixed scroll 50 and the orbiting scroll 60. As described above, the scroll compressor 1 has a structure capable of improving durability as compared with the related art.

In the present embodiment, the plating area of the orbiting scroll 60 is smaller than the plating area of the fixed scroll 50, and the other scroll 30B on which the second coating layer C2 is formed by nickel-phosphorus plating (Ni—P plating) is the orbiting scroll 60. As a result, Ni—P plating having a high plating construction cost per unit construction area is formed on the orbiting scroll 60 having a small (narrow) plating area. As a result, the plating cost is lower than the plating cost when the second coating layer C2 (Ni—P plating layer) is formed on the fixed scroll 50, and the manufacturing cost is reduced.

Figure 5:
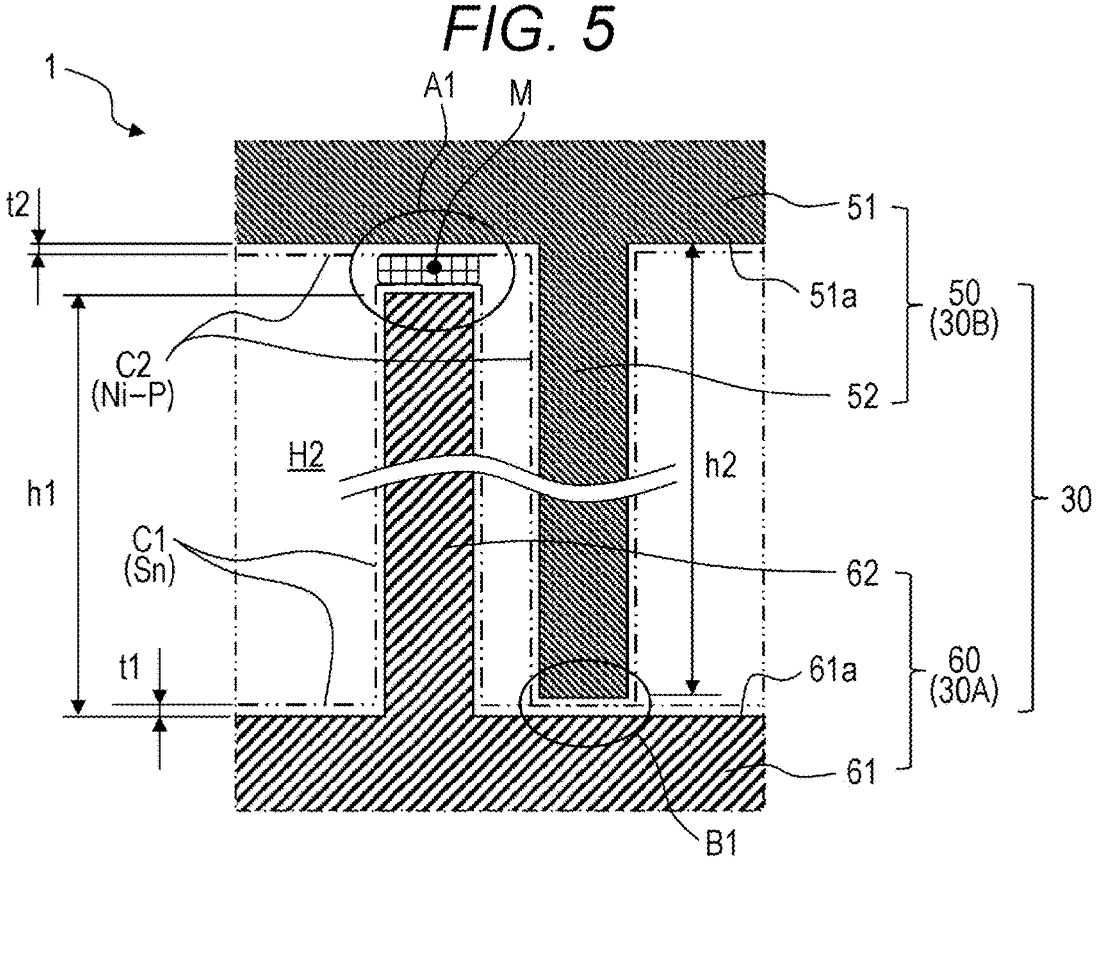
FIG. 5 is an enlarged cross-sectional view of a main part for explaining a modification of the scroll compressor.

Note that in the present embodiment, the other scroll 30B to be subjected to nickel-phosphorus plating is the orbiting scroll 60, but the present invention is not limited to this. As shown in FIG. 5, the other scroll 30B to be subjected to nickel-phosphorus plating might be the fixed scroll 50.

Specifically, referring to FIG. 5, in the scroll unit 30 of the scroll compressor 1 according to the modification, the other scroll 30B on which the second coating layer C2 is formed by nickel-phosphorus plating is the fixed scroll 50, and the one scroll 30A on which the first coating layer C1 is formed by tin plating (Sn plating) is the orbiting scroll 60. In this case, referring to FIG. 5, the wall height h2 of the fixed spiral wall 52 of the fixed scroll 50, which is the other scroll 30B is set higher than the wall height h1 of the orbiting spiral wall 62 of the orbiting scroll 60, which is the one scroll 30A formed with the tin plating. On the other scroll 30B, the first coating layer C1 formed by tin plating is formed on the compression chamber-side end face 61*a* of the orbiting baseplate 61 of the orbiting scroll 60 and the surface of the orbiting spiral wall 62, the second coating layer C2 formed by nickel-phosphorus plating is formed on the compression chamber-side end face 51*a* of the fixed baseplate 51 of the fixed scroll 50 and the surface of the fixed spiral wall 52, and the nickel-phosphorus plating (Ni—P plating) is formed. Referring to FIG. 5, the first coating layer C1 at the tip of the orbiting spiral wall 62 of the orbiting scroll 60 and the second coating layer C2 of the fixed baseplate 51 of the fixed scroll 50 are separated from each other, and the first coating layer C1 of the orbiting baseplate 61 of the orbiting scroll 60 and the second coating layer C2 at the tip of the fixed spiral wall 52 of the fixed scroll 50 are in contact with each other. Also in the scroll compressor 1 according to the modification, the weight of the scroll unit 30 is intended to be reduced, and durability is intended to be improved.

The description of the present embodiment is an example for describing the present invention, and does not limit the invention described in claims. In addition, the configurations of the components of the present invention are not limited to the foregoing embodiment, and various modifications can be made within the technical scope described in the claims.

LIST OF REFERENCE SIGNS

1 Scroll compressor
50 Fixed scroll
51 Fixed baseplate (baseplate)
51*a* Compression chamber-side end face
52 Fixed spiral wall (spiral wall)
60 Orbiting scroll
61 Orbiting baseplate (baseplate)
61*a* Compression chamber-side end face
62 Orbiting spiral wall (spiral wall)
30A One scroll
30B The other scroll
C1 First coating layer
C2 Second coating layer
h1 Wall height (wall height of the spiral wall of the one scroll)
h2 Wall height (wall height of the spiral wall of the other scroll)
H2 Compression chamber

The invention claimed is:

1. A scroll compressor comprising a fixed scroll and an orbiting scroll that are disposed to mesh with each other and have a baseplate and a spiral wall erected on the baseplate, the scroll compressor being configured to revolve the orbiting scroll with respect to the fixed scroll to compress a fluid taken into a compression chamber formed between the fixed scroll and the orbiting scroll, wherein the fixed scroll and the orbiting scroll are made of an aluminum-based material, a first coating layer formed by tin plating is formed on a compression chamber-side end face of the baseplate of the fixed scroll and a surface of the spiral wall of the fixed scroll, a second coating layer formed by nickel-phosphorus plating is formed on a compression chamber-side end face of the baseplate of the orbiting scroll and a surface of the spiral wall of the orbiting scroll, a wall height of the spiral wall of the orbiting scroll is set to be higher than a wall height of the spiral wall of the fixed scroll, the first coating layer at the tip of the spiral wall of the fixed scroll and the second coating layer of the baseplate of the orbiting scroll are separated from each other, the first coating layer of the baseplate of the fixed scroll and the second coating layer at the tip of the spiral wall of the orbing scroll are in contact with each other, and a plating area of the orbiting scroll is smaller than a plating area of the fixed scroll.

2. The scroll compressor according to claim 1, wherein the fluid is a gas refrigerant, and the gas refrigerant is taken into the compression chamber together with a lubricating oil, and an oil film made of the lubricating oil is formed in a gap between the first coating layer at a tip of the spiral wall of the fixed scroll and the second coating layer of the baseplate of the orbiting scroll.

* * * * *